(12) United States Patent
Kobori et al.

(10) Patent No.: US 12,456,325 B2
(45) Date of Patent: Oct. 28, 2025

(54) METHOD AND SYSTEM AND NON-TRANSITORY COMPUTER-READABLE STORAGE MEDIUM FOR HUMAN RE-IDENTIFICATION USING IMAGE DATA

(71) Applicant: TOYOTA JIDOSHA KABUSHIKI KAISHA, Toyota (JP)

(72) Inventors: Norimasa Kobori, Tokyo-to (JP); Rajat Saini, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 350 days.

(21) Appl. No.: 18/127,056

(22) Filed: Mar. 28, 2023

(65) Prior Publication Data

US 2023/0316798 A1    Oct. 5, 2023

(30) Foreign Application Priority Data

Mar. 30, 2022   (JP) ................................ 2022-056484

(51) Int. Cl.
   *G06V 40/10*     (2022.01)
   *G06T 7/73*      (2017.01)
(52) U.S. Cl.
   CPC ............. *G06V 40/103* (2022.01); *G06T 7/73* (2017.01); *G06T 2207/30196* (2013.01)
(58) Field of Classification Search
   None
   See application file for complete search history.

(56) References Cited

U.S. PATENT DOCUMENTS

| 10,691,950 | B2* | 6/2020 | Cao ....................... G06V 10/764 |
| 11,048,930 | B2* | 6/2021 | Doumbouya .......... G06V 40/10 |
| 11,182,620 | B2* | 11/2021 | Weinzaepfel .......... G06N 3/045 |
| 11,354,901 | B2* | 6/2022 | Cao ............................ G06T 7/74 |
| 12,236,223 | B2* | 2/2025 | Ueta ......................... G06F 8/64 |
| 2018/0260630 | A1* | 9/2018 | Cao .......................... G06V 20/47 |
| 2020/0151441 | A1* | 5/2020 | Doumbouya .......... G06V 40/10 |
| 2020/0160178 | A1* | 5/2020 | Kar ......................... G06T 11/00 |
| 2020/0394390 | A1* | 12/2020 | Zhang .................... G06V 20/59 |
| 2021/0235802 | A1* | 8/2021 | Koh ....................... G06T 11/00 |
| 2021/0264192 | A1* | 8/2021 | Eki ...................... H04N 25/778 |

(Continued)

FOREIGN PATENT DOCUMENTS

CN          113838092 A    12/2021
JP       2020-025261 A     2/2020

(Continued)

*Primary Examiner* — Tahmina N Ansari
(74) *Attorney, Agent, or Firm* — Dinsmore & Shohl LLP

(57) ABSTRACT

According to the human re-identification method according to the present disclosure, first, estimating a pose of a human to be re-identified in an image of the human is executed. Next, clipping a predetermined number of patches from the image along a body of the human based on the pose is executed. Then, generating positional information of each of the predetermined number of patches is executed. Then, inputting the predetermined number of patches with the positional information into a vision transformer encoder is executed. Then, inputting an output of the vision transformer encoder into a neural network is executed. And finally, obtaining an output of the neural network as a re-identification result of the human is executed.

5 Claims, 3 Drawing Sheets

(56) References Cited

U.S. PATENT DOCUMENTS

| | | | | |
|---|---|---|---|---|
| 2023/0271330 A1* | 8/2023 | Sundaralingam | ........ | B25J 9/163 |
| | | | | 700/246 |
| 2023/0316798 A1* | 10/2023 | Kobori | ...................... | G06T 7/73 |
| 2024/0242505 A1* | 7/2024 | Yarlagadda | ............ | G06V 10/12 |

FOREIGN PATENT DOCUMENTS

| | | | |
|---|---|---|---|
| JP | 6788929 B1 | 11/2020 | |
| JP | 2021-012707 A | 2/2021 | |

\* cited by examiner

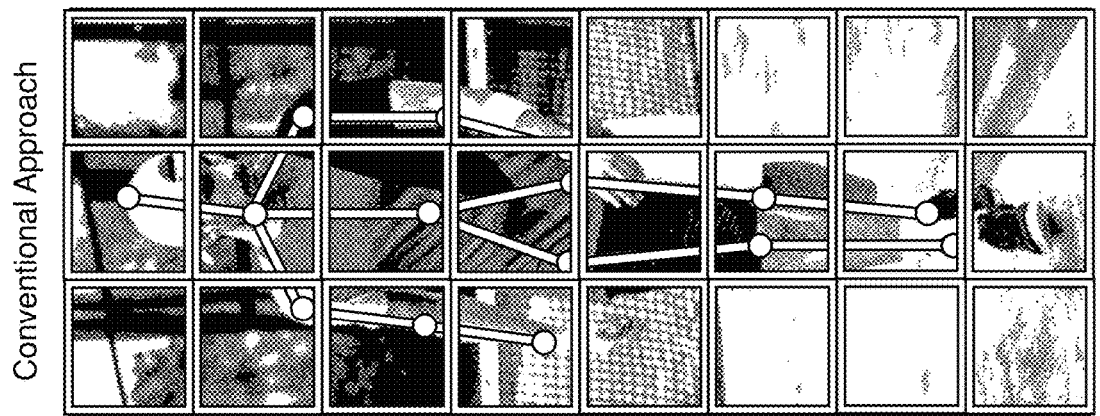
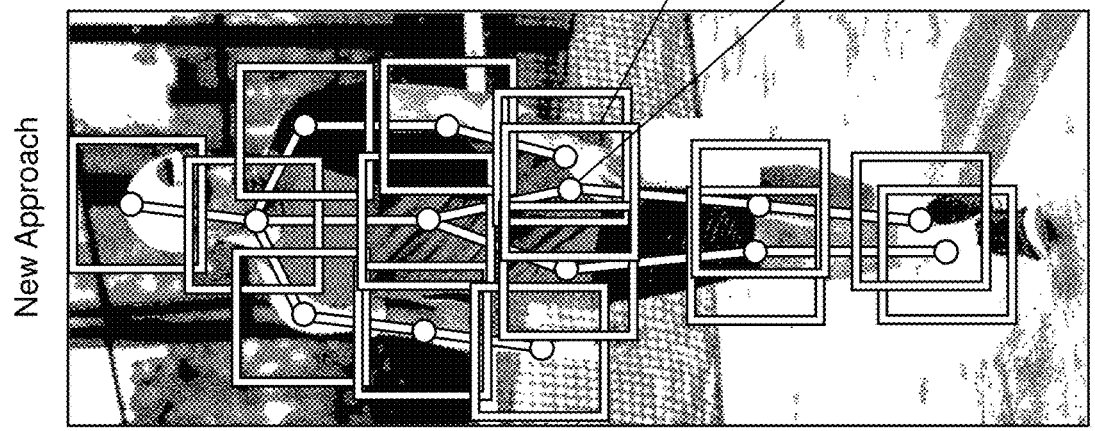
Fig.2B
Fig.2A

METHOD AND SYSTEM AND NON-TRANSITORY COMPUTER-READABLE STORAGE MEDIUM FOR HUMAN RE-IDENTIFICATION USING IMAGE DATA

CROSS-REFERENCE TO RELATED APPLICATION

The present application claims priority under 35 U.S.C. § 119 to Japanese Patent Application No. 2022-056484, filed Mar. 30, 2022, the disclosure of which is incorporated herein by reference in their entirety.

BACKGROUND

Field

The present disclosure relates to a human re-identification method, a human re-identification system and a non-transitory computer-readable storage medium storing a human re-identification program.

Background Art

A conventional technique for re-identification using image data is disclosed in JP2020-025261A. In this conventional technique, face detection using a learned model is executed to detect a face position from the image data. Then, partial image data extracted from the detected face position is generated. The partial image data of the face is processed by an application processor for identification of a person, face authentication, image collection for each person and so on.

As a reference showing the technical level of the technical field related to the present disclosure, JP2021-012707A and JP6788929B can be exemplified in addition to JP2020-025261A.

SUMMARY

Although the above-described conventional technology relates to face re-identification, research on human re-identification has also progressed. The human re-identification is a technique to re-identify a human from entire human image data such as image data of a pedestrian. However, currently proposed human re-identification has room for improvement in accuracy.

The present disclosure has been made in view of the above-mentioned problems, and an object thereof is to provide a technique to improve the accuracy of human re-identification.

The present disclosure provides a human re-identification technique for achieving the above object. The human re-identification technique according to the present disclosure applies Vision Transformer to human re-identification. Vision Transformer is an architecture that is superior to a convolutional neural network (CNN) that is conventional image processing in computational efficiency and scalability. In the human re-identification technique according to the present disclosure, further improvement is performed to the input to the encoder used in Vision Transformer, that is, a vision transformer encoder.

The human re-identification technique according to the present disclosure includes a human re-identification method, a human re-identification system and a human re-identification program.

The human re-identification method according to the present disclosure comprises following steps. A first step is to estimate a pose of a human to be re-identified (hereinafter, refer to as a target human) in an image of the target human. A second step is to clip a predetermined number of patches from the image along a body of the target human based on the estimated pose. A third step is to generate positional information of each of the predetermined number of patches clip from the image. A fourth step is to input the predetermined number of patches with the positional information into a vision transformer encoder. A fifth step is to input an output of the vision transformer encoder into a neural network. A sixth step is to obtain an output of the neural network as a re-identification result of the target human. However, some of the above-described steps may be appropriately integrated.

The human re-identification system according to the present disclosure comprises one or more processors and a program memory coupled to the one or more processors and storing executable instructions. The executable instructions are configured to cause the one or more processors to execute following processes. A first process is to estimate a pose of a target human in an image of the target human. A second process is to clip a predetermined number of patches from the image along a body of the target human based on the estimated pose. A third process is to generate positional information of each of the predetermined number of patches. A fourth process is to input the predetermined number of patches with the positional information into a vision transformer encoder. A fifth process is to input an output of the vision transformer encoder into a neural network. A sixth process is to obtain an output of the neural network as a re-identification result of the target human. However, some of the above-described processes may be appropriately integrated.

The human re-identification program according to the present disclosure is configured to cause a computer to execute following processes. A first process is to estimate a pose of a target human in an image of the human. A second process is to clip a predetermined number of patches from the image along a body of the target human based on the estimated pose. A third process is to generate positional information of each of the predetermined number of patches. A fourth process is to input the predetermined number of patches with the positional information into a vision transformer encoder. A fifth process is to input an output of the vision transformer encoder into a neural network. A sixth process is to obtain an output of the neural network as a re-identification result of the target human. However, some of the above-described processes may be appropriately integrated. The human re-identification program may be recorded on a non-transitory computer-readable storage medium.

According to the human re-identification technique of the present disclosure, since patches are clipped from the image along the body of the target human based on the pose of the target human, unwanted portions of the background of the image are cut out around the body of the target human and excluded from the input to the vision transformer encoder. Further, the size, number, and order of patches input to the vision transformer encoder are determined. As the data input to the vision transformer encoder is normalized in this manner, the variance of the data of each input becomes small. This makes it possible to improve the performance of the neural network and increase the accuracy of the human re-identification.

In the human re-identification technique according to the present disclosure, estimating the pose may include estimating positions of joints of the target human. In this case, clipping the predetermined number of patches may include clipping the same number of patches as the joints centering on the positions of the joints, and generating the positional information may include generating positional information of the joints. By clipping the patches centering on the positions of the joints, the whole human body are evenly cut out by the patches. Also, this makes it possible to provide consistency in the positions of the predetermined number of patches input to the vision transformer encoder.

In the human re-identification technique according to the present disclosure, the predetermined number of patches may include at least one pair of patches partially overlapped each other. By allowing patches to partially overlap each other, portions of the human body that are not cut out by patches can be reduced.

In the human re-identification technique according to the present disclosure, the predetermined number may be smaller than a division number when the image is divided by a size of a patch. This can reduce a computational load compared to dividing the image into patch sizes.

As described above, according to the human re-identification technique according to the present disclosure, the identification performance by the neural network can be improved, and the accuracy of the human re-identification can be increased.

BRIEF DESCRIPTION OF THE DRAWINGS

FIG. 2A is a diagram illustrating features of the human re-identification method according to the embodiment according to the present disclosure.

FIG. 2B is a diagram illustrating features of the human re-identification method according to the embodiment according to the present disclosure.

DETAILED DESCRIPTION

Hereunder, an embodiment of the present disclosure will be described with reference to the drawings. Note that when the numerals of numbers, quantities, amounts, ranges and the like of respective elements are mentioned in the embodiment shown as follows, the present disclosure is not limited to the mentioned numerals unless specially explicitly described otherwise, or unless the disclosure is explicitly designated by the numerals theoretically. Furthermore, structures that are described in the embodiment shown as follows are not always indispensable to the disclosure unless specially explicitly shown otherwise, or unless the disclosure is explicitly designated by the structures or the steps theoretically.

Figure 1:
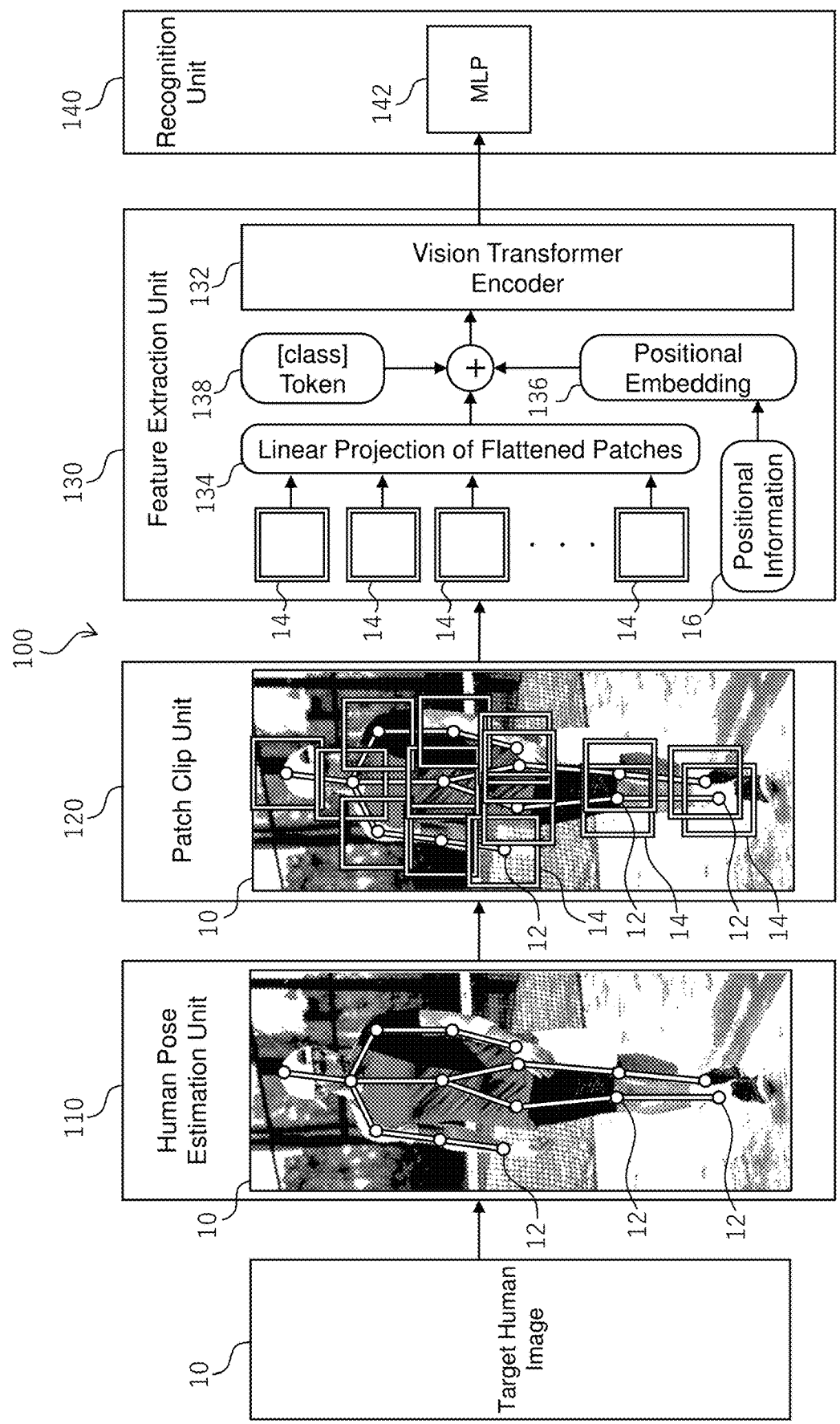
FIG. 1 is a diagram showing a configuration of a system for realizing a human re-identification method according to an embodiment according to the present disclosure.

FIG. 1 is a diagram showing a configuration of a system for realizing a human re-identification method according to the embodiment according to the present disclosure, that is, a human re-identification system. The human re-identification system 100 according to the present embodiment includes a human pose estimation unit 110, a patch clip unit 120, a feature extraction unit 130, and a recognition unit 140.

First, the human feature extraction unit 130 will be described. CNN is a common technique for extracting features from an image. However, in the human re-identification system 100 according to the present embodiment, Vision Transformer (ViT) is used instead of CNN as a technique for extracting features from the image 10 of a target human to be re-identified (hereinafter, referred to as a target human image). That is, the feature extraction unit 130 is configured as ViT. ViT is a model of image processing that does not use CNN proposed in the article "Dosovitskiy, A.; Beyer, L.; Kolesnikov, A.; Weissenborn, D.; Zhai, X.; Unterthiner, T.; Dehghani, M.; Minderer, M.; Heigold, G.; Gelly, S.; et al. An image is worth 16×16 words: Transformers for image recognition at scale. arXiv 2020, arXiv:2010.11929".

The input of ViT needs to be one-dimensional sequence data. For this reason, the target human image 10 itself, which is two-dimensional data, is not an input of ViT. In the feature extraction unit 130, each of a plurality of patches 14 clipped from the target human image 10 is processed to be flattened, i.e., converted into one-dimensional sequence data by a linear embedding function 134. Further, linear projection using a learned filter is performed on the one-dimensional sequence data converted from the plurality of patches 14 by the linear embedding function 134. By the linear projection performed, an embedded patch sequence is obtained finally.

In the feature extraction unit 130, positional information 16 is embedded in the embedded patch sequence by a positional embedding function 136. The positional information 16 is information for identifying where each of the plurality of patches 14 is located in the target human image 10. Also, a [class] token 138 is added at the beginning of the embedded patch sequence to allow image classification.

The feature extraction unit 130 includes a vision transformer encoder 132 (hereinafter, referred to as a Vit encoder). The embedded patch sequence to which positional embedding is added is input to the ViT encoder 132. Since the architecture of the ViT encoder 132 is as disclosed in the above-mentioned article on ViT, a detailed description thereof is omitted here. The ViT encoder 132 outputs a feature map.

The recognition unit 140 receives an input of the feature map from the ViT encoder 132. The recognition unit 140 comprises a neural network. A multi-layer perceptron (MLP) 142 is one example thereof. MLP 142 performs image classification on the features map. An output result of MLP 142 is obtained as a result of re-identification of the target human. However, the neural network constituting the recognition unit 140 is not limited to MLP 142. For example, CNN may be used in the recognition unit 140.

Next, the patch clip unit 120 will be described. The plurality of patches 14 input to the ViT encoder 132 in the feature extraction unit 130 are clipped from the target human image 10 by the patch clip unit 120. The method of clipping the patches 14 by the patch clip unit 120 is different from the method in conventional ViT.

In conventional ViT, an original image is divided into square patches. Then, an embedded patch sequence is generated from the patches obtained by dividing the original image. When the resolution of the original image is (H, W) and the size of the patches is (P, P), the number N of patches input to the encoder in conventional Vit is expressed by $N=(H \times W)/(P \times P)$. That is, the number of patches depends on the resolution of the original image and the size of the patches. In the embedded patch sequence, the sequence number of each patch is embedded as the positional information of each patch.

On the other hand, in the patch clip unit 120, a predetermined number of patches 14 are clipped from the target human image 10 along the body of the target human. Clipping the patches 14 along the body of the target human means that portions in which the target human appears are clipped by the patches 14 from the target human image 10. Therefore, portions in which the target human does not appear remains without being clipped. In other words, there is no patch 14 clipping only a portion in which the target human does not appear. In the conventional method, the number of patches is determined by the resolution of the image and the size of the patches, whereas according to the patch clip unit 120, the number of the patches 14 clipped from the target human image 10 is constant regardless of the resolution of the target human image 10.

More specifically, clipping the patches 14 from the target human image 10 is performed centering on the joints 12 of the human body. In the example shown in FIG. 1, fifteen patches 14 are clipped centering on the positions of fifteen joints 12 including both wrist joints, both elbow joints, both shoulder joints, both ankle joints, both knee joints, both hip joints, waist joint, neck joint, and head top regarded as a joint. That is, the number of the patches 14 clipped by the patch clip unit 120 is the same as the number of the joints 12 defined in advance. Then, the positions of the joints 12 are respectively the positions of the patches 14 to be clipped. Each of the joints 12 is also numbered. The numbers assigned to the joint 12 is a sequence number when the corresponding patch 14 is input to the ViT encoder 132.

The positions of the joints 12 of the target human is estimated by the pose estimation unit 110. The pose estimation unit 110 obtains the target human image 10, and estimates the pose of the target human by a known pose estimation method. Estimating the pose of the target human includes estimating the positions of the joints 12 of the target human. For example, the method disclosed in the article "Gregory Rogez, Philippe Weinzaepfel, Cordelia Schmid: LCR-Net++: Multi-human 2D and 3D Pose Detection in Natural Images. IEEE Trans. Pattern Anal. Mach. Intell. 42(5): 1146-1161 (2020)" can be used as the pose estimation method by the pose estimation unit 110.

As described above, the human re-identification method according to the present embodiment does not use conventional ViT as it is, but improves the input to the ViT encoder 132. FIGS. 2A and 2B are diagrams for explaining the characteristics of the human re-identification method according to the present embodiment when compared with the conventional method.

FIG. 2A shows a new approach to input to the ViT encoder by the human re-identification method according to the present embodiment, and FIG. 2B shows a conventional approach. In the conventional approach shown in FIG. 2B, the target human image is divided by patches. Thus, in the conventional approach, the patches include many unwanted portions of the background, and there are also patches composed of only the background. In the conventional approach, since the patches are obtained by equally dividing the target human image into a plurality of squares, the patches do not overlap each other. Although joints are displayed in FIG. 2B, the pose of the target human including the positions of the joints is not estimated in the conventional approach.

On the other hand, in the new approach shown in FIG. 2A, since the patches are clipped from the target human image centering on the positions of the joints defined in advance, unwanted portions of the background of the image are cut out around the body of the target human. In addition, patches having a predetermined size are always generated centering on the positions of respective joints, instead of simply clipping parts of the body of the target human. In other words, the new approach allows consistency in patch order, patch position, and patch size. This makes it possible to decrease the variance of the data of each input to the ViT encoder to accelerate learning, and moreover, to learn only the points where there is cross-correlation in a concentrated manner. As a result, the identification performance by the neural network at the subsequent stage can be improved, and the accuracy of the human re-identification can be enhanced.

According to the new approach, the number of patches clipped from the target human image is smaller than the number of divisions when the target human image is divided by the size of the patch in the conventional approach. This can reduce the computational load of the ViT encoder compared to dividing the image into patch sizes. The fact that partial overlap between patches is allowed is also a feature of the new approach, which is different from the conventional approach.

Figure 3:
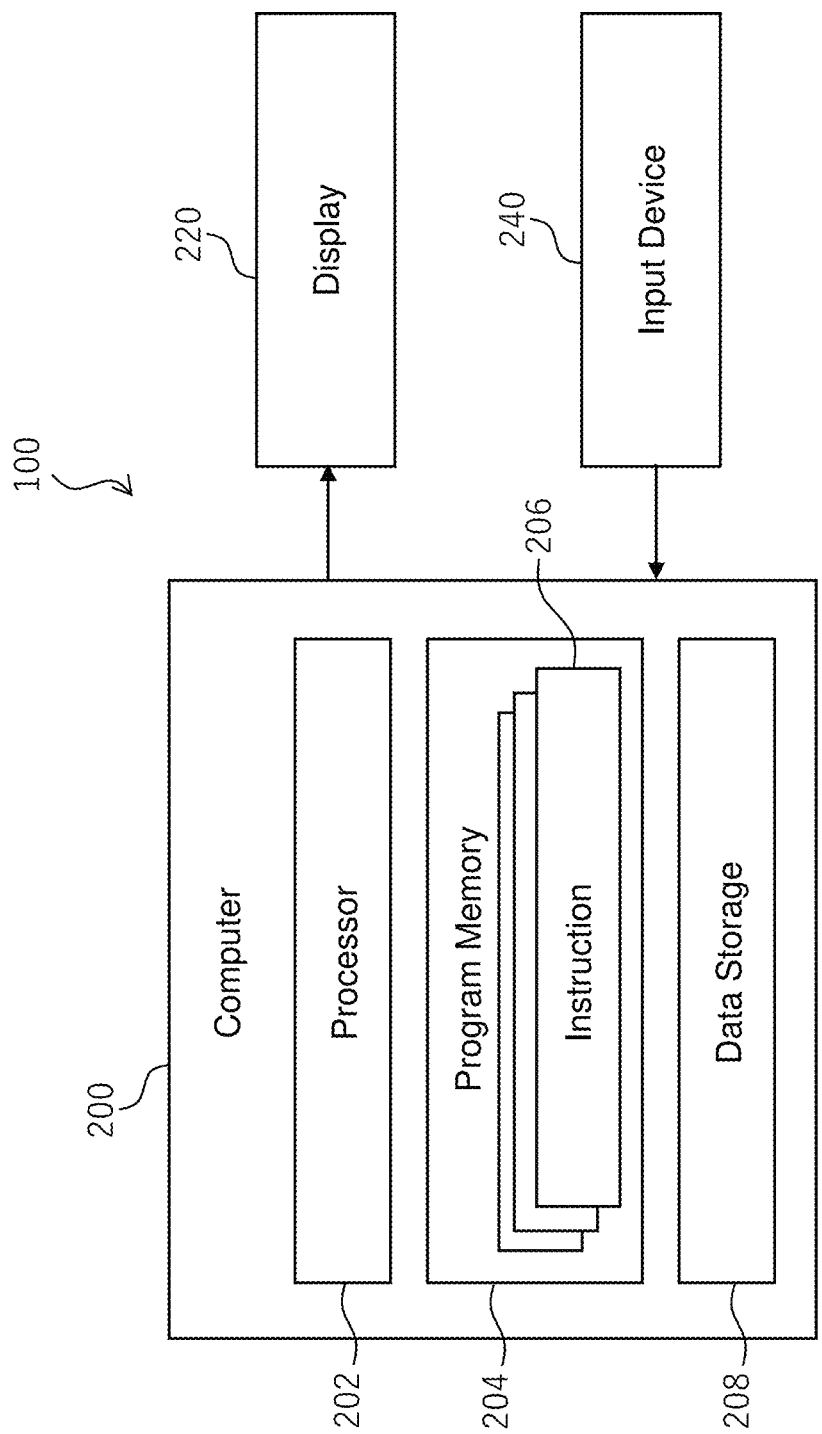
FIG. 3 is a diagram showing an example of a hardware configuration of the human re-identification system according to the embodiment according to the present disclosure.

Finally, an example of the hardware configuration of the human re-identification system 100 according to the present embodiment will be described with reference to FIG. 3.

The human re-identification system 100 comprises a computer 200, a display device 220, and an input device 240. The computer 200 includes a processor 202, a program memory 204, and a data storage 208. The processor 202 is coupled to the program memory 204 and the data storage 208.

The program memory 204 is a non-temporary memory for storing a plurality of executable instructions 206. The data storage 208 is, for example, a flash memory, an SSD, or an HDD, and stores the image 10 and the data required for executing the instructions 206. The instructions 206 constitute a human re-identification program. Some or all of the instructions 206 are executed by the processor 202, whereby the functions of the pose estimation unit 110, the patch clip unit 120, the feature extraction unit 130, and the recognition unit 140 are implemented in the computer 200.

The display device 220 displays the calculation result of the computer 200. The input device 240 is, for example, a keyboard or a mouse, and accepts operations on the computer 200. Incidentally, the human re-identification system 100 may be configured by a plurality of computers connected by a network, or may be configured by a server on the Internet.

What is claimed is:

1. A human re-identification method, comprising:
   estimating positions of predefined joints of a human to be re-identified in an image of the human;
   clipping from the image, along a body of the human, the same number of patches as the joints, each patch being centered on a corresponding joint, based on the positions of the joints;
   generating positional information of each of the joints;
   inputting the same number of patches as the joints with the positional information of the joints into a vision transformer encoder in a predetermined joint order;
   inputting an output of the vision transformer encoder into a neural network; and
   obtaining an output of the neural network as a re-identification result of the human.

2. The human re-identification method according to claim 1, wherein the number of patches include at least one pair of patches partially overlapped each other.

3. The human re-identification method according to claim 1, wherein the number of patches is smaller than a division number when the image is divided by a size of a patch.

4. A human re-identification system, comprising:
one or more processors; and
a program memory coupled to the one or more processors and storing executable instructions,
wherein the executable instructions are configured to cause the one or more processors to:
estimate positions of predefined joints of a human to be re-identified in an image of the human;
clip from the image, along a body of the human, the same number of patches as the joints, each patch being centered on a corresponding joint, based on the positions of the joints;
generate positional information of each of the joints;
input the same number of patches as the joints with the positional information of the joints into a vision transformer encoder in a predetermined joint order;
input an output of the vision transformer encoder into a neural network; and
obtain an output of the neural network as a re-identification result of the human.

5. A non-transitory computer-readable storage medium storing a human re-identification program configured to cause a computer to:
estimate positions of predefined joints of a human to be re-identified in an image of the human;
clip from the image, along a body of the human, the same number of patches as the joints, each patch being centered on a corresponding joint, based on the positions of the joints;
generate positional information of each of the joints;
input the same number of patches as the joints with the positional information of the joints into a vision transformer encoder in a predetermined joint order;
input an output of the vision transformer encoder into a neural network; and
obtain an output of the neural network as a re-identification result of the human.

* * * * *